March 26, 1940.   J. J. MOLZER   2,194,908
CONICAL SELF-TIGHTENING BEARING
Filed July 29, 1938   2 Sheets-Sheet 1
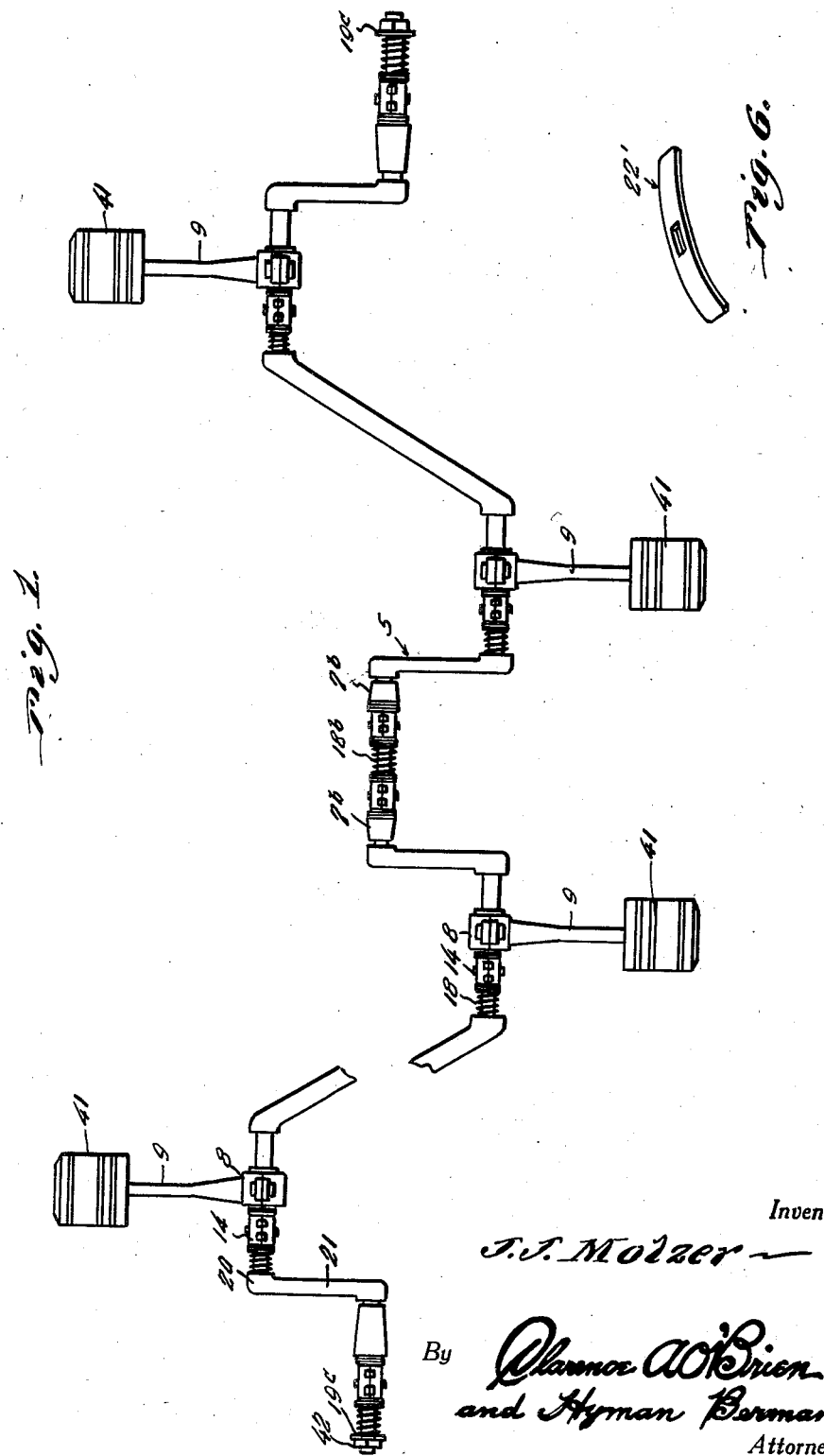
Inventor
J. J. Molzer
By Clarence A. O'Brien
and Hyman Berman
Attorneys March 26, 1940. J. J. MOLZER 2,194,908
CONICAL SELF-TIGHTENING BEARING
Filed July 29, 1938 2 Sheets-Sheet 2
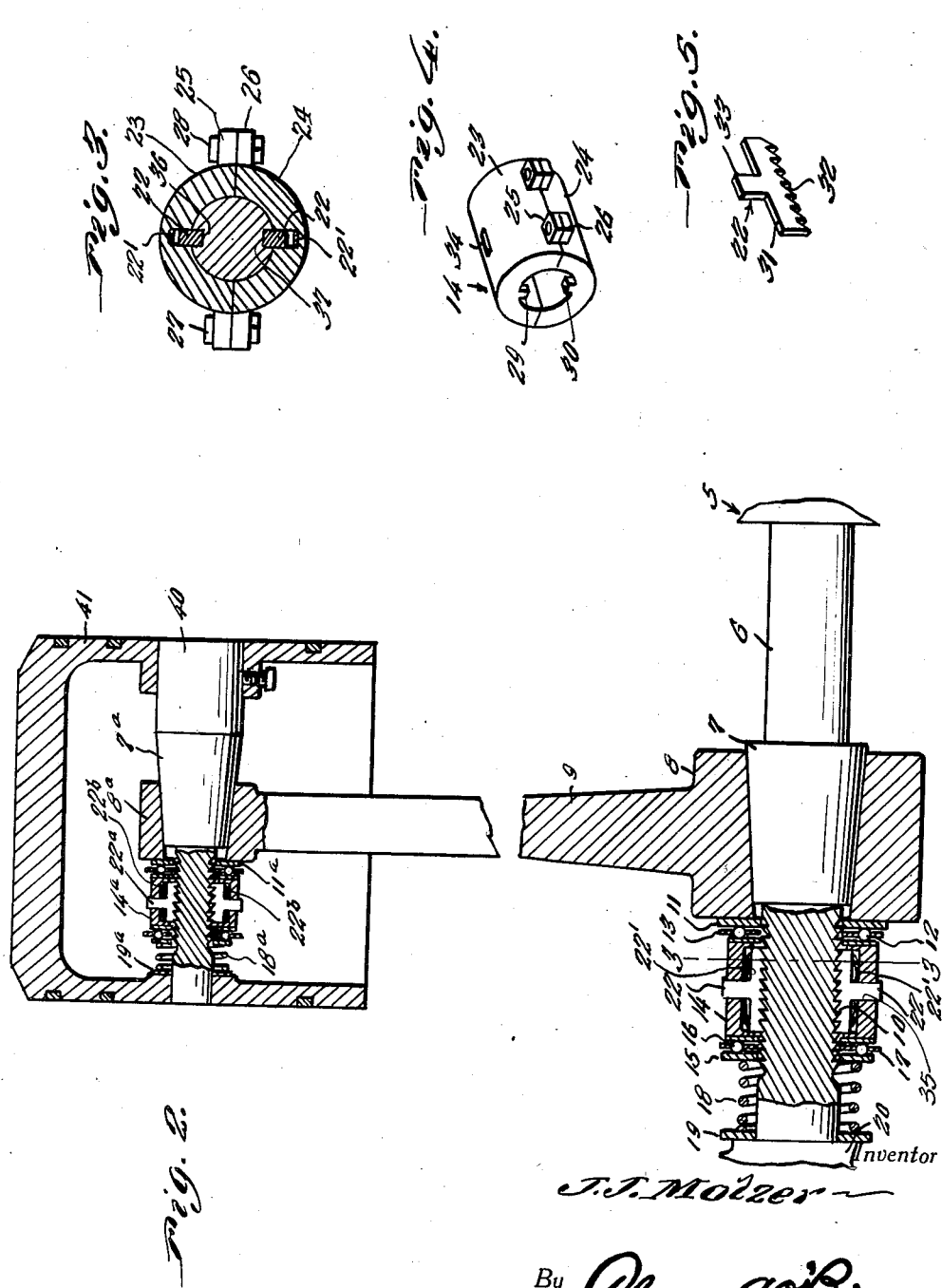

Patented Mar. 26, 1940

2,194,908

UNITED STATES PATENT OFFICE 2,194,908

CONICAL SELF-TIGHTENING BEARING

John Joseph Molzer, Crete, Nebr.

Application July 29, 1938, Serial No. 222,030

8 Claims. (Cl. 308—70)

My invention relates generally to self-tightening bearings particularly for internal combustion engines or the like, and particularly to self-tightening bearing structures actuated to effect the tightening action by spring means operating in conjunction with ball bearing supported rollers, and an important object of my invention is to provide simple and efficient arrangements of this character.

Other important objects and advantages of the invention will be apparent from a reading of the following description taken in connection with the drawings, wherein for purposes of illustration I have shown preferred embodiments of my invention.

In the drawings:

Figure 1 is a general schematic showing of embodiment of bearings in accordance with the present invention in the main and connecting rod bearings of an internal combustion engine.

Figure 2 is an enlarged transverse vertical sectional view taken through a portion of Figure 1 and illustrating in detail the application of the bearing structure of the present invention to both connecting rod and wrist-pin bearings of the internal combustion engine.

Figure 3 is a transverse vertical sectional view taken through Figure 2 approximately on the line 3—3.

Figure 4 is a perspective view of the roller cage.

Figure 5 is a perspective view of one of the pawls.

Figure 6 is a perspective view of one of the ratchet pressure applying and equalizing springs.

Referring in detail to the drawings, the numeral 5 generally designates an internal combustion engine crankshaft having a throw 6 which is modified in accordance with the present invention by the provision thereon of an enlarged tapered bearing surface 7 on which is rotatably and slidably fitted in the crankshaft end 8 of the connecting rod 9. The throw 6 adjacent the small end of the bearing surface 7 is provided with a groove 36 having longitudinally arranged ratchet teeth 10 which lean toward the bearing surface 7. A washer 11 engages the adjacent face of the connecting rod end 8 and against this rides a series of ball bearings 12 mounted in a race 13 which is interposed between the washer 11 and the ratchet mounting cage 14. Between the opposite end of the ratchet cage 14 and a washer 15 is another series of ball bearings 16 mounted in a suitable race 17, and against the outer side of the washer 15 bears a helical spring 18 which is circumposed on the throw 6 and whose opposite end works against another washer 19 which abuts against the enlarged portion 20 of the adjacent crank 21. By means of this arrangement the spring 18 constantly urges the assembly described, which is freely mounted on the throw 6, in a direction to urge the connecting rod end 8 toward the large end of the tapered bearing surface 7 and thereby take up the wear which develops between the bearing surface 7 and the connecting rod end 8.

The ratchet mounting cage 14 and its ratchets 22 operate as means to positively prevent any receding action of the automatic tightening mechanism described. The cage comprises upper and lower sections 23, 24 which are semi-circular and provided on opposite longitudinal edges with companion pairs of lugs 25, 26 adapted to be clamped by suitable bolts 27, 28 to assemble the sections. Each section has at its opposite ends internal projections 29, 30, respectively, to act as stops for the opposite ends of the T-shaped pawls 22 which have ratchet teeth 32 arranged along one longitudinal edge thereof reversed with respect to the ratchet teeth 10 on the throw 6 with which these teeth are engageable. The standard portions 33 of the pawls operate in respective openings 34 and 35 formed centrally through the respective sections 23 and 24. Outwardly bowed leaf springs 22' are, as shown in Figures 2 and 3, interposed between the respective pawls and the radially outward boundary of the grooves in which the pawls work to keep the pawls evenly engaged with the teeth 10 on the throw 6 in any receding action of the cage 14 which may tend to take place during the operation of the crankshaft, in opposition to the spring 18, and the springs 22' are sufficiently strong in engaging the opposite ends of the outer edge of the pawls to keep the pawls evenly seated in the respective grooves 36 and 37 formed in the throw 6 and in which the ratchet teeth 10 are located, while permitting sufficient radial movement of the pawls to enable them to jump over the teeth 10 when urged by the spring 18 to take up wear in the bearing. The springs 22' have openings slidably accommodating the standard portion 33 of the pawls. As soon as any receding action takes place in opposition to the spring 18 due to the operation of the connecting rod on the crankshaft, the pawls engage the ratchet teeth 10 and positively limit such receding motion and thereby keep the connecting rod end 8 properly engaged with the bearing surface 7 according to the amount of wear obtaining. The provision of the ball bearing assemblies is made to permit the connecting rod end 8 to rotate with respect to the cage 14 and to permit the cage 14, which is connected to the throw 6 to rotate freely relative to the crank 21, with a minimum of friction, the entire mechanism being properly lubricated by the oil in the crankcase of the engine and being capable of being lubricated in any manner desired consistent with conventional practice. The slant of the ratchet teeth permits of expansion of the bearing when hot.

A substantially similar arrangement as that described above is employed in connection with the wrist pin 40 in the piston 41, the wrist pin 40 having a relatively large diameter and being provided with a conical bearing surface 7a on which the corresponding end 8a of the connecting rod is rotatably mounted, the pin being entered from the corresponding side of the piston in assembling. In this application of the invention the washer 19a corresponding to the washer 19 of the already described embodiment bears against the side wall structure of the piston instead of against a crank 20, but in all other respects the structure is similarly formed and arranged.

In the case of the center main bearing of the crankshaft two of the assemblies already described are used and disposed in opposite positions as shown in Figure 1, with the operating spring 18b disposed therebetween so as to push the units in opposite directions to engage the conical bearings 7b with the main bearing (not shown) formed generally similar to the connecting rod ends already described, that is, tapered to conform to the contour of the conical bearings 7b.

In the case of the end bearings of the crankshaft the washer 19c is retained by a nut 42 threaded on the end of the crankshaft instead of being engaged either with the side wall of a piston or with the protuberance on a crank 20.

Although I have shown and described herein preferred embodiments of my invention, it is to be definitely understood that I do not desire to limit the application of the invention thereto, and any change or changes may be made in the structure and arrangement of parts, within the spirit of the invention and the scope of the subjoined claims.

Having described the invention, what is claimed as new is:

1. In combination, a rotary element having an abutment at one end, a conical bearing surface on said element having its larger end remote from said abutment, a bearing element having a tapering bore rotatably and slidably circumposed on said conical bearing surface, ratchet teeth formed longitudinally on said rotary element between said abutment and said conical bearing, a pawl engaging said ratchet teeth, carrier means supporting said pawl and permitting longitudinal movement of the pawl relative to said rotary element only toward said conical bearing surface, said carrier means being movable along said rotary element and having operative engagement with the bearing element, and spring means operating between said abutment and said carrier means and urging said bearing element along said conical bearing to take up wear therein, said pawl operating with said ratchet teeth to positively prevent unwanted receding movement of the said bearing element relative to said conical bearing, and spring means in said carrier means and operatively engaging said pawls for yieldably holding said pawls in a radially inward direction for evenly engaging said pawls with said ratchet teeth.

2. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage slidably but non-rotatably mounted on said part of the shaft-like member, spring means interposed between said abutment and the adjacent end of said cage and forcibly engaging the opposite end of said cage with said bearing element, longitudinally arranged ratchet dog means in said cage and engaged with the ratchet teeth on said part, spring means for holding the dog means in engagement with the ratchet teeth and guide means carried by the cage for the dog means.

3. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said element and the adjacent end of said cage and forcibly engaging the opposite end of said cage with said bearing element, and longitudinally arranged ratchet dog means on said cage and engaged with the ratchet teeth on said part, said ratchet dog means being mounted on said cage for radial movement relative thereto, and spring means on said cage urging said ratchet dog means toward engagement with said ratchet teeth.

4. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said abutment and the adjacent end of said cage and forcibly engaging the opposite end of said cage with said bearing element, and longitudinally arranged ratchet dog means on said cage and engaged with the ratchet teeth on said part, anti-friction thrust bearings arranged between the said spring means and said adjacent end of said cage and between the said opposite end of the cage and said bearing element.

5. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said abutment and the adjacent end of said cage and forcibly engaging the opposite end of said cage and with said bearing element, and longitudinally arranged ratchet dog means on said cage and engaged with the ratchet teeth on said part, said cage comprising at least two complementary longitudinally divided segments with means securing the same together.

6. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said abutment and the adjacent end of said cage and forcibly engaging the opposite end of said cage with said bearing element, and longitudinally arranged ratchet dog means on said cage and engaged with the ratchet teeth on said part, means keying said cage to said part of said shaft-like member, said means comprising a longitudinal groove formed in said part and an interior lug on said cage entering said groove and longitudinally slidable therein.

7. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said abutment and the adjacent end of said cage and forcibly engaging the opposite end of said cage with said bearing element, and longitudinally arranged ratchet dog means on said cage and engaged with the ratchet teeth on said part, said ratchet dog means having shank means extending radially through opening means formed in said cage, and spring means interposed between said cage and the main body of said dog means urging said dog means toward engagement with said ratchet teeth.

8. In combination, a shaft-like member having a stationary abutment and a stationary bearing tapered toward said abutment, said abutment and bearing being axially spaced along said rotor with the part of the rotor between them formed with ratchet teeth facing toward said bearing, a bearing element having a tapered bore turning on said stationary bearing, a cage circumposed on said part of the shaft-like member, spring means interposed between said abutment and the adjacent end of said cage and forcibly engaging the opposite end of said cage with said bearing element, and longitudinally arranged ratchet dog means on said cage and engaged with the ratchet teeth on said part, said ratchet dog means having shank means extending radially through opening means formed in said cage, and spring means interposed between said cage and the main body of said dog means urging dog means toward engagement with said ratchet teeth, the last-mentioned spring means comprising a longitudinally arranged leaf spring.

JOHN JOSEPH MOLZER.